(12) United States Patent
Grund

(10) Patent No.: US 6,385,831 B1
(45) Date of Patent: May 14, 2002

(54) WORKTABLE FOR A MACHINE TOOL

(76) Inventor: Peter Grund, Raichbergweg 12, 78647 Trossingen (DE)

( * ) Notice: Subject to any disclaimer, the term of this patent is extended or adjusted under 35 U.S.C. 154(b) by 0 days.

(21) Appl. No.: 08/824,279

(22) Filed: Mar. 26, 1997

(30) Foreign Application Priority Data

Apr. 2, 1996 (DE) .......................................... 196 13 129

(51) Int. Cl.$^7$ .......................... B23Q 16/10; B23Q 5/56
(52) U.S. Cl. .................... 29/48.5 R; 29/38 C; 29/42; 29/46; 74/814; 74/816; 82/159
(58) Field of Search ................... 29/48.5 R, 33 P, 29/35.5, 38 C, 46, 42; 74/813 C, 814, 820, 821, 822, 826, 393; 82/159, 129; 92/13.7, 152

(56) References Cited

U.S. PATENT DOCUMENTS

| | | | |
|---|---|---|---|
| 2,896,413 A | 7/1959 | Hussey | 92/62 |
| 3,583,258 A | * 6/1971 | Fouse | 74/820 |
| 4,333,363 A | * 6/1982 | Inaba et al. | 74/813 C |
| 4,335,498 A | * 6/1982 | Hague et al. | 74/820 X |
| 4,377,953 A | * 3/1983 | Hagen | 74/821 |
| 4,491,044 A | * 1/1985 | Haas et al. | 82/159 |
| 4,657,054 A | * 4/1987 | Schaltegger | 74/393 |
| 4,803,765 A | 2/1989 | Ito | 29/48.5 R |
| 5,735,514 A | * 4/1998 | Moore et al. | 74/822 |

FOREIGN PATENT DOCUMENTS

| | | |
|---|---|---|
| DE | 1 187 984 | 2/1965 |
| DE | 39 24 335 A1 | 4/1991 |
| DE | 42 01 464 A1 | 7/1993 |
| DE | 44 10 103 C1 | 8/1995 |
| EP | 0 517 086 A2 | 12/1992 |
| EP | 0 654 608 A1 | 5/1995 |
| JP | 62-124855 | 11/1997 |

OTHER PUBLICATIONS

Von Franz J. Wittoch, "Geschwindigkeitsregulierung bei pneumatischen Zylindern," Automation, 1980, pp. 2315–2318, "technika".

Dr.–Ing. G. Scheffel et al., "Elektrohydraulische Achse mit integrieter Elektronik," Vorschubantriebe, 1986, pp. 458–461, "Ölhydraulik+Pneumatik".

* cited by examiner

Primary Examiner—William Briggs
(74) Attorney, Agent, or Firm—Cummings & Lockwood

(57) ABSTRACT

A workpiece table, provided for a machine tool, is movable back and forth between two end positions and has for this purpose a rotational drive which has a gear part joined to the workpiece table for rotation thereof, a toothed rack in engagement therewith, as well as a medium-actuated shift drive for displacement of the toothed rack, which thereby performs a linear stroke motion, delimited by stops, between two end locations corresponding to the end positions of the workpiece table. Provided on the workpiece table is a mechanism which acts upon the toothed rack with a higher feed force at the beginning of the linear stroke movement than during the remainder of the linear stroke.

23 Claims, 4 Drawing Sheets

WORKTABLE FOR A MACHINE TOOL

BACKGROUND OF THE INVENTION

1. Field of the Invention

The present invention relates to a workpiece table, provided for a machine tool, that is movable back and forth between two end positions and has a rotational drive which has a gear part joined to the workpiece table for rotation thereof, a toothed rack in engagement therewith, as well as a medium-actuated shift drive for displacement of the toothed rack, which thereby performs a linear stroke motion, delimited by stops, between two end locations corresponding to the end positions of the workpiece table.

2. Related Prior Art

A workpiece table of this kind, often also called a turntable, is known from practical use.

In many machine tools, the workpiece table is divided into a machining side and a loading side, such that a first workpiece can be machined on the machining side while a second workpiece, yet to be machined, is at the same time being clamped on the loading side. In this context, the machining side and loading side are often separated from one another by a spray shielding panel in order to protect the operator from flying chips and sprays of cutting fluid.

For tool changing, the workpiece table and the spindle head of the machine tool perform a movement relative to one another in which the machining side and loading side are interchanged.

One possibility for performing said workpiece change consists in using the turntable cited initially. Turntables of this kind are often used when the machine tool constructed therewith is intended to occupy as little space as possible.

For a workpiece change, the workpiece table is rotated alternately by the rotational drive through +/−180 degrees, the workpiece table being positioned in its end positions by means of, for example, serration splining. When the workpiece table is to be rotated, it is first lifted out of the serration splining before a toothed rack is then shifted from its one end location into the other, whereby it rotates a gear part and, by means thereof, the workpiece table into the respective other end position. After completion of this rotary movement, the workpiece table is lowered back down onto the serration splining.

The shift drive for displacing the toothed rack generally operates with compressed air, the two end surfaces of the toothed rack acting as thrust faces of a bidirectionally medium-actuated thrust piston. At the end of its respective linear stroke, the toothed rack arrives, with its end face upon which compressed air is not acting, against a stop, so that the linear stroke is delimited in both directions by stops.

The general desire in the mechanical engineering industry is to perform not only tool changes but also workpiece changes at shorter and shorter intervals, so that rotation of the workpiece table should occur as quickly as possible. A very rapid rotation of the workpiece table means, however, that the toothed rack arrives against the stops at a high velocity, resulting in hard impacts and shocks. Impacts and shocks of this kind are disadvantageous, however, in terms of workpiece clamping, since such shocks can result in loss of alignment in workpiece clamping fixtures, impairing the reproducibility of the machining operation. Another concern is that the workpiece table with the fixtures clamped thereon has a very large mass, so that with a corresponding rotational velocity, a relatively high rotational energy must be nullified in the end locations of the toothed rack. In the case of the known machine tool, shock absorbers, which extend outward away from the toothed rack at the stops and face the end faces of the toothed rack with their pistons, are provided for this purpose. Because of the high rotational energy that must be nullified, these shock absorbers protrude a great deal, so that overall they contribute to a large physical width for the known machine tool.

The general desire in the case of such machine tools is to make available machine tools with the minimum possible overall size, which allow the quickest possible workpiece change with no repercussions on the working accuracy of the machine tool. In order to meet this need, it is an object of the present invention to improve the workpiece table mentioned at the outset in such a way that while having a physically simple design, it allows rapid rotation with as little impact and jerking as possible; the external dimensions of the machine tool containing the new workpiece table are intended to be as small as possible.

SUMMARY OF THE INVENTION

In the case of the workpiece table mentioned at the outset, this object is achieved by the fact that a mechanism is provided which acts upon the toothed rack with a higher feed force at the beginning of the linear stroke movement than during the remainder of the linear stroke.

The object underlying the invention is thereby completely achieved. Specifically, the inventors of this application have recognized that by means of a "starting acceleration" with a higher feed force, the inert mass of the workpiece table must first be overcome before the remaining rotary movement is performed with the usual feed force. This initially higher feed force thus ensures much faster rotation of the workpiece table between its two end positions, so that the workpiece change is thereby greatly accelerated. It is now entirely possible, by means of the new mechanism, to select the action upon the toothed rack in such a way that a high feed force is exerted initially, a usual feed force during the middle rotational range, and a lower feed force toward the end of the rotary movement, so that overall, the usual damping is sufficient to decelerate the rotating workpiece table in its end locations.

In an embodiment, it is preferred if the mechanism comprises an auxiliary shift drive which temporarily acts upon the toothed rack with an additional feed force at the beginning of the linear stroke movement.

This feature has the design-related advantage that the temporary additional feed force can be applied, for example, electrically or magnetically. A further advantage here is that said auxiliary shift drive can also be retrofitted, so that even existing machine tools can be subsequently refitted for more rapid rotation of the workpiece table.

The object underlying the invention is thus also achieved by means of an optionally retrofittable auxiliary shift drive for a rotational drive for a workpiece table of a machine tool which can be moved back and forth between two end positions, the rotational drive having a gear part joined to the workpiece table for rotation thereof, a toothed rack in engagement therewith, as well as a medium-actuated shift drive for displacement of the toothed rack, which thereby performs a linear stroke motion, delimited by stops, between two end locations corresponding to the end positions of the workpiece table, the auxiliary shift drive acting temporarily on the toothed rack with an additional feed force at the beginning of the linear stroke movement.

This auxiliary shift drive has the aforementioned advantage that it is retrofittable.

It is further preferred here if the auxiliary shift drive is medium-actuated, an auxiliary shift drive preferably being provided for each linear stroke direction of the toothed rack.

The advantage of this feature is that the same functional principle and actuation medium can be used for the auxiliary shift drive as for the original shift drive. This makes possible a generally simple physical design, since no additional energy sources need to be provided.

It is further preferred if the shift drive comprises thrust pistons at both end faces of the toothed rack acting respectively thereon, and if the auxiliary shift drive contains, at the two end faces, auxiliary thrust pistons acting respectively thereon, which preferably have a greater piston surface area than the thrust pistons and perform a shorter linear stroke than the latter.

The advantage here is that, so to speak, two thrust pistons one behind the other can be used, the auxiliary thrust piston, because of its greater piston surface area, exerting a greater feed force on the toothed rack for a given medium pressure than the standard thrust piston. Since the linear stroke of the auxiliary thrust piston is much shorter than the linear stroke of the toothed rack, the additional thrust force resulting from the auxiliary thrust piston acts only during an initial portion of the linear stroke of the toothed rack, thus providing, in an astonishingly simple manner, for an initially greater feed force, and then only the usual feed force, to act during the linear stroke movement of the toothed rack.

This simple design also allows for extremely uncomplicated retrofitting of existing machine tools with the auxiliary shift drive: the auxiliary thrust piston simply needs to be placed externally on the usual shift drive, the piston rod of the auxiliary thrust piston then acting, for example, directly on the thrust piston of the original shift drive. All that is then necessary is to connect the auxiliary shift drive to the medium line, which is already supplying the standard shift drive and providing it with compressive energy.

On the other hand, it is preferred if the toothed rack is configured as a bidirectionally medium-actuated thrust piston, on both of whose end faces an actuation medium, and a respective auxiliary thrust piston which has preferably a greater diameter than the toothed rack at its end faces and performs a shorter stroke than the toothed rack, act alternately.

This feature is advantageous in terms of design, since the toothed rack itself has at its end faces surfaces to be acted upon by pressure medium, on which the auxiliary thrust piston simultaneously acts during a short initial linear stroke and thereby exerts an additional feed force.

It is preferred in this context if each auxiliary thrust piston acts with its piston rod on the associated end face of the toothed rack, a stop for the auxiliary thrust piston being provided to delimit the linear stroke performed thereby.

This feature is also of design-related advantage, since the linear stroke movement of the auxiliary thrust piston is delimited in simple fashion. Since the mass of the auxiliary thrust piston and thus the energy to be nullified are negligibly small compared with conditions prevailing in the case of the workpiece table, the impact generated by the auxiliary thrust piston stop does not affect the machining accuracy of the new machine tool.

It is preferred in general if two damping mechanisms are provided, each acting between a stop for the toothed rack and the latter itself in order to decelerate the rotating workpiece table in its end positions.

This feature is known in the art; its purpose is to nullify the energy of motion of the workpiece table with as little impact as possible in order not to impair the operating accuracy of the machine tool.

It is preferred in this context if the damping mechanisms build up a regulated counterpressure for controlled deceleration of the moving toothed rack.

This feature, which is novel and inventive even when considered per se in the case of the workpiece table mentioned at the outset, ensures particularly gentle stoppage of the rotary motion of the workpiece table; these advantages are achieved even if no mechanism ensuring a temporarily higher feed force is provided.

With this feature, the thrust piston and/or the auxiliary thrust piston can now be used on the particular side of the toothed rack that is not being thrust upon, by building up in the corresponding pressure chambers a counterpressure which makes possible controlled deceleration of the toothed rack. This counterpressure can, for example, be elevated relatively quickly to a high value shortly before the end location of the toothed rack is reached, so that much of the energy of motion is nullified. The counterpressure is then released in controlled fashion so that it has approximately completely decayed when the toothed rack has reached its end location, preventing "bouncing".

This feature now also allows faster rotation of the workpiece table, since the latter can be driven with a higher rotational velocity without resulting in greater impacts upon deceleration of the workpiece table, which would deleteriously influence the operating accuracy and reproducibility of the machine tools equipped therewith. It is possible, for example, to elevate the operating pressure for the usual shift drive so that a greater feed force acts during the entire linear stroke movement of the toothed rack and consequently also leads to a more rapid rotation of the workpiece table. The higher rotational energy associated therewith, which must be nullified when the end location is reached, is now absorbed by the regulated counterpressure.

Thus this new damping mechanism also achieves the object underlying the invention, because it ensures faster rotation of the new workpiece table and at the same time allows gentler stoppage of said workpiece table in its end positions.

The new damping mechanism can also, in and of itself, be retrofitted; in the simplest case, further compressed-air supply lines into the pressure chambers on both sides of the toothed rack simply need to be made available, provision then being made for regulation of the counterpressure via these two further compressed-air supply lines by means of, for example, a compressor. An already existing vent valve can, of course, also be refitted for this purpose.

The invention thus also concerns an optionally retrofittable damping mechanism for a rotational drive for a workpiece table of a machine tool which can be moved back and forth between two end positions, the rotational drive having a gear part joined to the workpiece table for rotation thereof, a toothed rack in engagement therewith, as well as a medium-actuated shift drive for displacement of the toothed rack, which thereby performs a linear stroke motion, delimited by stops, between two end locations corresponding to the end positions of the workpiece table, the damping mechanism building up a regulated counterpressure for controlled deceleration of the moving toothed rack.

The advantage of this damping mechanism is, as already mentioned, that it can also be retrofitted to existing machine tools, so that either gentler stoppage of the rotating workpiece table, or more rapid rotation of the workpiece table, is possible thereon, the new damping mechanism ensuring that the impacts occurring are no greater than in the case of the previous design of the rotational drive.

It is preferred in this context if the respective damping mechanism is configured on the shift drive and/or the auxiliary shift drive, and preferably generates, on the thrust side of the auxiliary thrust piston not presently being used to drive the toothed rack and/or on the associated end face of the toothed rack, a counterpressure which, during the return stroke of said auxiliary thrust piston effected by the toothed rack, decelerates the linear stroke movement of the toothed rack.

This feature is advantageous in design terms because it very elegantly combines the advantages of the auxiliary shift drive and those of the new damping mechanism. Initial experiments by the applicant of this application have indicated that with these features, a typical workpiece changing time can be reduced from 2.5 seconds to 1.5 seconds. Since a considerable effort must be made, in the case of the machine tools mentioned at the outset, to achieve time advantages on the order of tenths of a second, a time advantage of 1 second represents an enormous step forward, which reduces the workpiece-to-workpiece time for a correspondingly equipped machine tool to an unexpectedly high degree.

Additionally or alternatively, damping can also occur directly at the toothed rack. A separate vent valve is not even required for this; instead the compressed-air connection can serve as vent during the period in which it is not acting on the toothed rack; this requires simply a suitable external layout of the compressed-air hoses. Design changes to existing shift drives are therefore not necessary; they must simply be operated in the manner according to the invention in order to achieve the desired damping characteristics.

It is generally preferred in this context if the counterpressure has a regulated pressure profile; preferably each auxiliary thrust piston has on its thrust side, and/or the thrust piston has on its end faces, a respective pressure chamber to be vented by a vent valve, and the vent valve is a controlled valve, so that venting of the pressure chamber is enabled in controlled fashion, during the return stroke effected by the toothed rack, in such a way that a high counterpressure initially builds up for damping purposes, and is vented or limited when the toothed rack approaches its end location.

The advantage here is that the regulated counterpressure is provided for in a simply designed fashion. After displacement of the toothed rack into the one end location, the pressure chamber of the auxiliary thrust piston effecting said displacement is at the working pressure of the operating medium. When the toothed rack is then displaced back into the original starting location, it comes into contact, toward the end of its motion, with the piston rod of the auxiliary thrust piston, which consequently also performs a return stroke. During this return stroke the vent valve of the pressure chamber is first kept closed so that a high counterpressure gradually builds up. Said vent valve is then opened as a function of the location of the auxiliary thrust piston so that the pressure chamber is vented in controlled fashion until the toothed rack has reached its end location.

It is further preferred if the damping mechanism comprises a shock absorber which acts between the piston rod and stop.

The advantage here is that the shock absorber can nullify any unconsumed residual rotational energy of the workpiece table. This must be considered in the context that the rotational energy of the workpiece table depends, among other things, on the weight of the particular clamping fixtures being used, so that different rotational energies need to be nullified for differently equipped workpiece tables. Now, however, in order to adjust the controlled buildup of the counterpressure in as simple a fashion as possible, a shock absorber is additionally provided which compensates for the fluctuations in residual energy that were not absorbed by the counterpressure. In other words, the shock absorber is used whenever the rotational energy of the workpiece table was greater than could be absorbed and nullified by the counterpressure. As a result, however, the control system of the new machine tool is very simple.

In an embodiment, it is preferred if the shock absorber acts between the toothed rack and auxiliary thrust piston, the shock absorber preferably being arranged in the toothed rack and/or in the piston rod of the auxiliary thrust piston.

The advantage here is that the shock absorber no longer absolutely needs to be installed externally onto the auxiliary shift drive, so that the new machine tool can thereby be physically very narrow. The reason is that as compared with the prior art machine tool mentioned at the outset, the shock absorber must nullify much less energy, since much of the rotational energy is nullified by the counterpressure. The shock absorbers are therefore much smaller in this case than in the related art, so that they result in a much narrower machine tool even when installed externally. This is especially the case when they are housed in the toothed rack and/or in the piston rod of the auxiliary thrust piston. This is possible, as stated, because the shock absorbers in this case have much smaller dimensions than in the related art, where such an arrangement would not be possible.

The invention thus also concerns a machine tool which is equipped with a workpiece table in which the auxiliary shift drive and/or the damping mechanism are used.

The object underlying the invention is also completely achieved by this new machine tool, since because of the auxiliary shift drive ,the machine tool now makes possible a much faster tool change that is, however, also already possible due to the new damping mechanism. The new damping mechanism enables moreover the shock absorbers to be placed internally, so that the new machine tool is also physically much narrower.

It is further preferred in the case of the new damping mechanism if the regulated valve is a throttling valve that, when an opening pressure or a specific position of the piston is reached, preferably automatically vents the pressure chamber or operates with a constant throttling cross section.

The advantage here is first of all that with automatic opening, the regulated counterpressure can be, so to speak, automatically built up and then released again, or limited to a maximum; separate control devices therefor are not required, so that this feature has particular design-related advantages.

In the case of the constant throttling cross section, it is advantageous that a valve of very simple design can be used. Since said valve is, so to speak, always open, the result is a constant dissipation of discharge air, i.e. a continuous venting of the corresponding pressure chamber, the velocity of the pressure buildup and release being governed by the throttling cross section;. Because this throttling valve has no moving parts, it is not only economical but also highly reliable.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWING

Embodiments of the invention are shown in the appended drawings and will be explained in more detail in the description below. In the drawings.

DETAILED DESCRIPTION OF THE PREFERRED EMBODIMENTS

Figure 1:
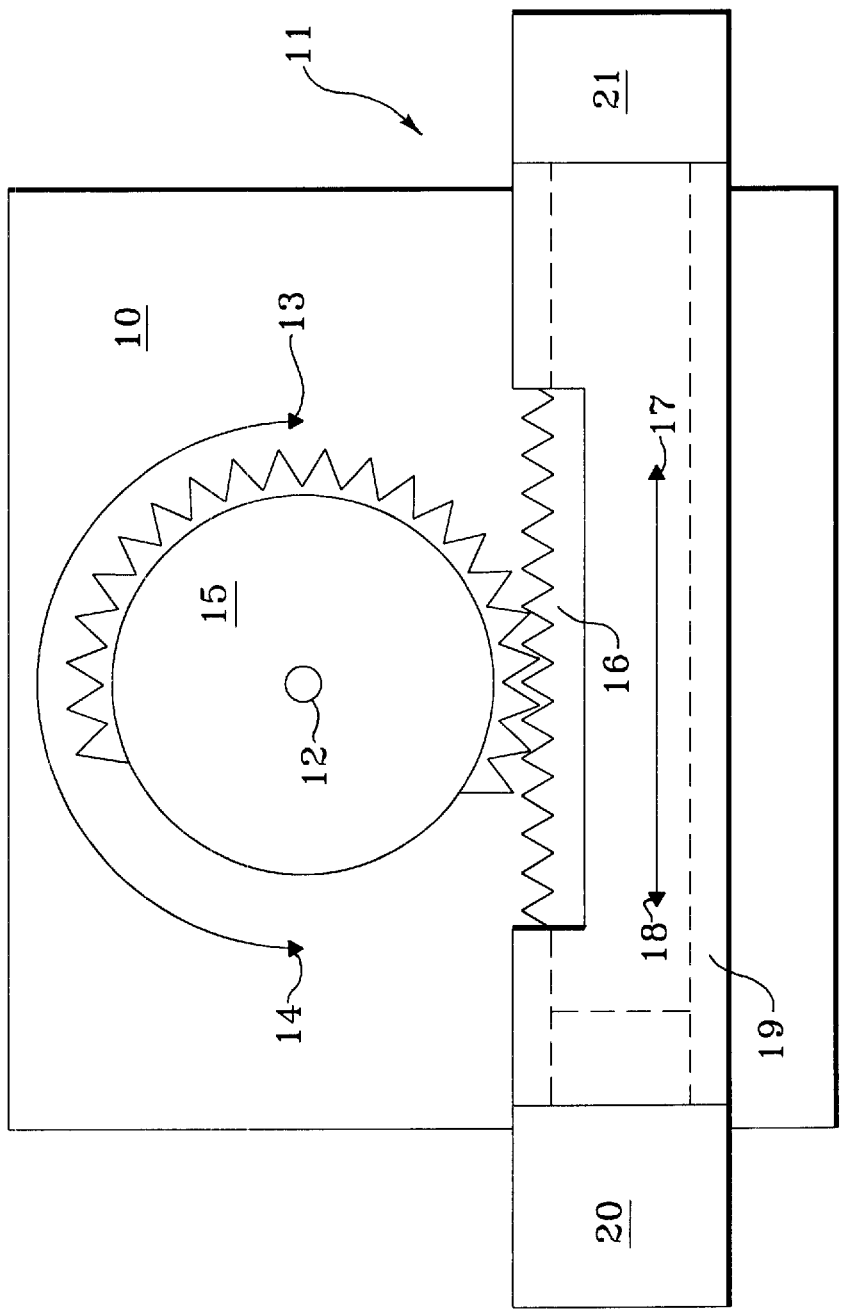
FIG. 1 shows a schematic plan view of the workpiece table according to the invention, with a schematically indicated rotational drive.

In FIG. 1, 10 designates a very schematically depicted workpiece table that is used as a turntable in a machine tool that is not shown for reasons of clarity. Workpiece table 10 has a rotational drive 11 by means of which workpiece table 10 can be rotated +/−180 degrees about its vertical axis 12 in the direction of a double arrow 13/14.

Said workpiece table 10 is usually divided on its upper side into a loading side and a machining side, such that the loading side and the machining side can be interchanged by rotation of workpiece table 10.

For this purpose, rotational drive 11 comprises a gear part 15 that is joined to workpiece table 10 in such a way that it rotates the latter in the direction of double arrow 13/14. A longitudinally displaceable toothed rack 16, which can be displaced back and fort h along double arrow 17/18, is in engagement with gear part 15. Toothed rack 16 sits in a housing 19 on whose ends shift drives 20 and 21 are provided to displace toothed rack 16 in the direction of double arrow 17/18.

Shift drive 20 displaces toothed rack 16 in the direction of arrow 17, so that the workpiece table rotates in the direction of arrow 14. In the situation shown in FIG. 1 this rotation has taken place, so that shift drive 21 can now displace toothed rack 16 in the direction of arrow 18 so as thereby to pivot workpiece table 10 back in the direction of arrow 13.

Figure 2:
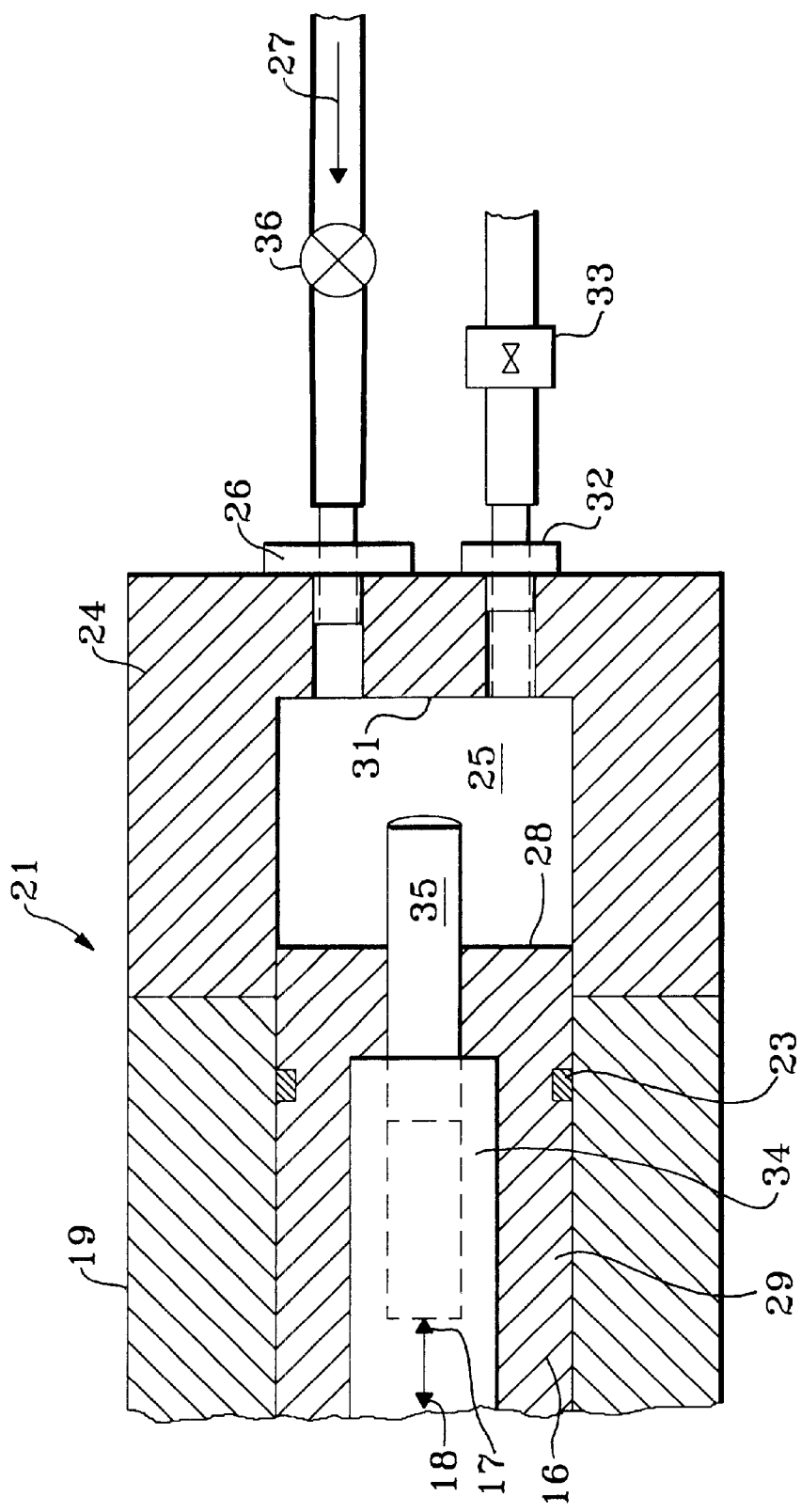
FIG. 2 shows a shift drive such as can be used with the rotational drive according to FIG. 1, the new damping mechanism being used and a temporarily higher feed force being made available.

FIG. 2 now shows a first embodiment of shift drive 21 in a schematic representation in longitudinal section. It is understood that shift drive 20 is constructed and arranged in mirrorimage fashion with respect to shift drive 21.

It is evident from FIG. 2 that toothed rack 16 has a seal 23 by means of which it is guided in pressure-tight fashion in its tubular housing 19. Adjoining housing 19 is a housing 24 of shift drive 21 which has internally a pressure chamber 25. Toothed rack 16 projects into said pressure chamber 25 and can be acted upon on its end face 28, via a compressed-air connection 26, by a medium indicated at 27, in such a way that it moves to the left in FIG. 2 in the direction of arrow 18. Toothed rack 16 thus functions as a thrust piston 28, being designed, because of the identical configuration of shift drive 21, as a bidirectionally medium-actuated thrust piston 29.

When shift drive 20 moves toothed rack 16 in FIG. 2 in the direction of arrow 17, it ultimately comes into contact at its end face 28 with a stop 31, as a result of which the linear stroke movement of toothed rack 16—and therefore, because of the engagement between toothed rack 16 and gear part 15, the rotary movement of workpiece table 10—are stopped.

In order to make this stoppage gentle, a regulated counterpressure is built up in pressure chamber 25 and is then released again in controlled fashion. A valve 32 which is vented in controlled fashion by a venting control system 33 is provided for this purpose. When toothed rack 16 now moves to the right in FIG. 2, valve 32 is first closed so that the pressure in pressure chamber 25 gradually rises and thus counteracts the movement of toothed rack 16 in damping fashion. Once this counterpressure has reached a certain value, said counterpressure is released again or limited in regulated fashion via venting control system 33, so that toothed rack 16 and thus workpiece table 10 are gently decelerated into their end locations in the manner of a terminal braking system.

By means of venting control system 33, valve 32 is not closed during the entire return movement of toothed rack 16, but rather only during a final section of that return stroke, so that the counterpressure is not built up until toward the end of the rotary movement, so that the initial rotation can occur in undamped and therefore rapid fashion.

Since, however, the rotational energy to be nullified depends on the mass of the particular fixtures arranged on the workpiece table, a shock absorber 34 which projects with its piston 35 beyond end face 28 is also provided in toothed rack 16. When toothed rack 16 now moves to the right in FIG. 2 in the direction of arrow 17, piston 35 thus comes into contact with stop 31, so that during the very end of the return stroke of toothed rack 16, energy is additionally nullified by the damping effect of shock absorber 34.

Damping mechanism 32, 33, 34, 35 described so far thus ensures gentle deceleration of the rotating workpiece table 10.

In order now to increase the rotary movement of workpiece table 10, the compressed-air connection is equipped with a compressor 36 which provides a regulated feed force. At the beginning of the linear stroke of toothed rack 16, a higher pressure is built up in pressure chamber 25 so that the inertia of the workpiece table can be quickly overcome and the latter rotates at a correspondingly high velocity. As soon as this high rotational velocity has been reached, the feed force is reduced by regulating compressor 36 appropriately. With this reduced feed force, which for example must be sufficient only to overcome the friction of the individual bearing parts in order to maintain rotational velocity, workpiece 10 now proceeds into its corresponding other end position. Damping mechanism 32, 33, 34, 35 on the respective other shift drive 21, 20 now ensures that despite the high rotational velocity of the workpiece table, deceleration occurs gently, so that hard impacts or shocks, which might negatively influence the reproducibility and reliability of the machine tool, do not occur.

While one shift drive 20 or 21 is driving toothed rack 16, the other respective shift drive 21 or 20 is providing endlocation damping, and vice versa.

Of course it is not necessary to house shock absorber 34 in toothed rack 16; it can instead also be arranged externally on housing 24, so that it extends to the right in FIG. 2. Because of the additional counterpressure applied by the damping mechanism, however, shock absorber 34 can be designed to be much smaller than was necessary in the related art, where damping by means of counterpressure was not used. It is therefore now possible to build the shock absorber directly into toothed rack 16, so that the overall width of the workpiece table, and of the machine tool equipped with it, is considerably reduced.

In summary, therefore, the controlled thrust force produced, for example, by compressor 36 provides more rapid rotation, while the elevated damping due to valve 32 and venting control system 33 ensures that the rotation energy, which is now higher, can be absorbed without impact. Because of the additional shock absorber 34, venting control system 33 can operate largely independently of the mass of the particular workpiece table, since excess rotational energy is nullified in shock absorber 34. This contributes to a simple design.

Figure 3:
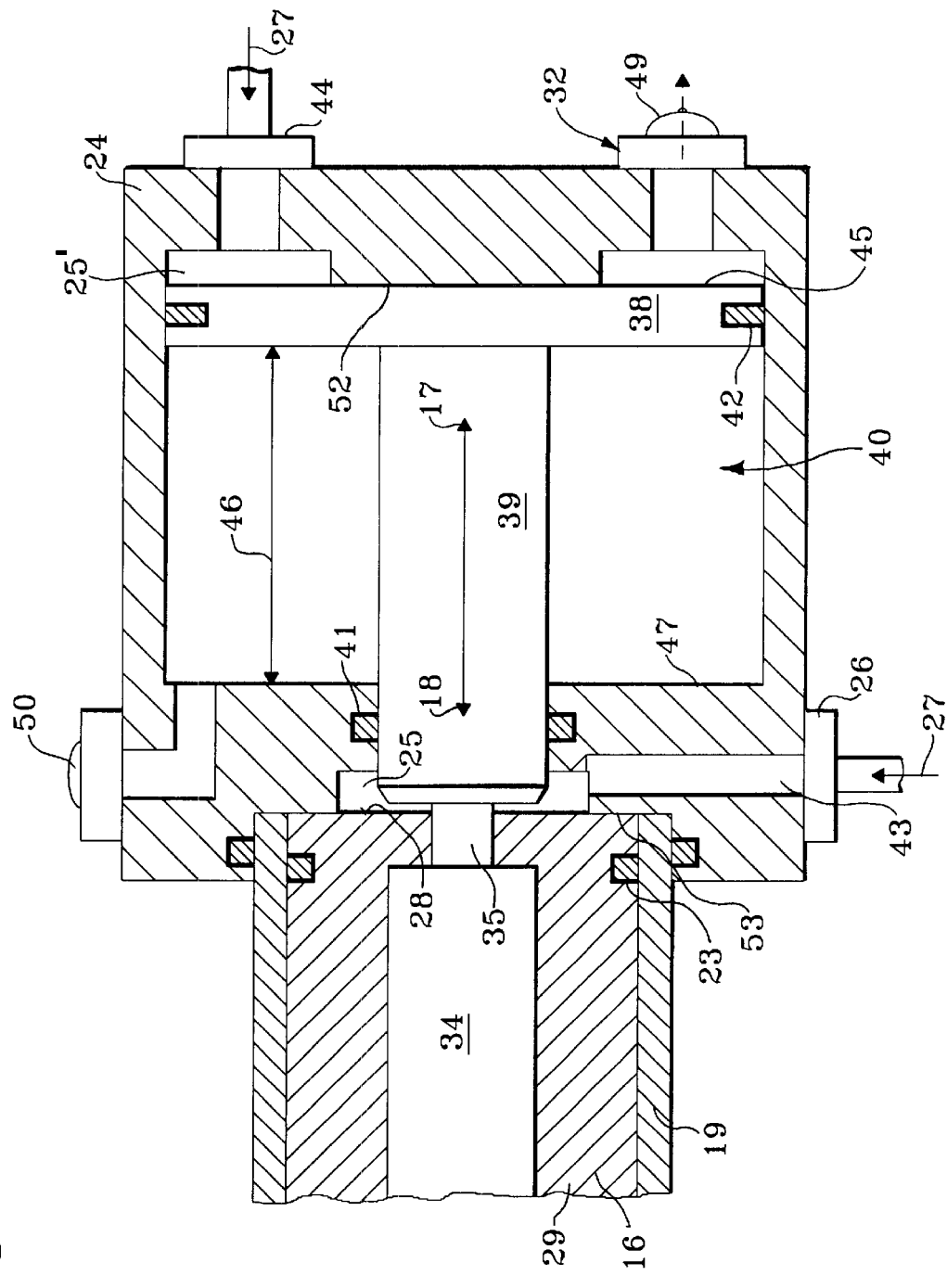
FIG. 3 shows a further embodiment of the shift drive according to FIG. 1, in which the newauxiliary shift drive and the new damping mechanism are used.

FIG. 3 now shows a second embodiment of shift drive 21 that offers further design-related simplifications as compared with the embodiment according to FIG. 2.

An auxiliary thrust piston 38 that is in contact at its piston rod 39 with end face 28 of toothed rack 16 is now provided in housing 24 of shift drive 21. Auxiliary thrust piston 38 and piston rod 39 constitute an auxiliary shift drive 40 that is arranged in housing 24, in pressure-tight fashion thanks to seals 41 and 42.

Compressed-air connection 26 for actuation of toothed rack 16 acting as thrust piston 29 is now implemented by a radial orifice 43 through which, as before, medium 27 acts on end face 28 of toothed rack 16.

A further compressed-air connection 44, through which actuation medium 27 acts on auxiliary thrust piston 38 in a pressure chamber 25's on its thrust side 45, is provided to actuate auxiliary thrust piston 38.

When actuation medium 27 acts in this fashion, the auxiliary thrust piston is moved to the left in FIG. 3 in the direction of arrow 18, performing a linear stroke 46 and ultimately arriving against a stop 47 which delimits linear stroke movement 46. Said stroke movement 46 is much shorter than the entire linear stroke of toothed rack 16, but it is also evident from FIG. 3 that thrust side 45 of auxiliary thrust piston 38 has a much larger surface area than end face 28 of toothed rack 16. Since both compressed-air connections 26 and 44 are acted upon by the same medium, e.g. compressed air at 6 bars, auxiliary shift drive 40 exerts a much greater feed force on toothed rack 16 than is possible via end face 28. This elevated feed force acts, however, only during the initial linear stroke 46; thereafter, toothed rack 16 moves to the left in FIG. 3 in the direction of arrow 18, the feed force now being applied only by medium 27 in coaction with end face 28.

In other words, at the beginning of the linear stroke movement of toothed rack 16, an additional feed force is exerted on toothed rack 16 via auxiliary shift drive 40, so that turntable 10 quickly assumes its rotational velocity. The lesser feed force via end face 28 then ensures only that bearing friction, etc. are overcome.

Deceleration of toothed rack 16 in its end locations occurs in a manner similar to that already described in connection with FIG. 2, at the identically configured other shift drive 22. A counterpressure which ensures gentle stoppage of toothed rack 16 is again built up via valve 32. In addition, shock absorber 34—whose piston 35 has, in the position shown in FIG. 3, been completely pushed in—is again provided betw!Yeen toothed rack 16 and piston rod 39.

In order to simplify the physical design further, however, valve 32 is configured here as throttling valve 49, so that venting control system 33 can be dispensed with. Throttling valve 49 now provides for buildup of a counterpressure in pressure chamber 25'. As soon as this counterpressure has reached a value predefined by throttling valve 49, that pressure is maintained so that the remaining compressed air is vented via valve 32. A regulated counterpressure is thereby obtained with no need for larger-scale control mechanisms. It is also possible for the throttling valve not to open until a certain piston position is reached.

Alternatively, throttling valve 49 can also have a constant throttling cross section so that by means of a constant dissipation of discharge air, continuous venting of the corresponding pressure chamber 25, 25' becomes possible, so that here again a pressure is first built up, and then released again after completion of the linear stroke.

The use of a throttling valve 49 is possible, in the case of the embodiment of FIG. 3, for reasons which include the fact that pressure chamber 25 is sealed with respect to pressure chamber 25'. Pressure chamber 25 has a much greater length in the direction of double arrow 17/18 than does pressure chamber 25', since linear stroke 46 of auxiliary thrust piston 38 represents only a small portion of the total linear stroke of toothed rack 16 between its two end locations.

The pressure increase in the relatively small pressure chamber 25' now ensures, in coaction with the simple throttling valve 49, that a regulated counterpressure is built up which at least partly compensates for the rotational energy of the workpiece table as it approaches its end position. The remaining energy, as already described with reference to FIG. 2, is absorbed by shock absorber 35.

Compared with the embodiment according to FIG. 2, in the case of the embodiment according to FIG. 3 both damping mechanism 32, 49, 34, 35 and auxiliary shift drive 40 are of much simpler design; neither compressor 36 nor venting control system 33 is necessary, since these functions are taken over by auxiliary thrust piston 38 which performs a limited linear stroke 46, and by throttling valve 49.

It should also be noted that a vent 50 is further provided for venting in housing 24, so that any medium located in front of auxiliary thrust piston 38 can escape.

Also visible in FIG. 3, finally, is a stop 52 against which auxiliary thrust piston 38 arrives when it performs its return stroke effected by returning toothed rack 16. Toothed rack 16 itself, as before, arrives against a further stop 53 that substantially corresponds to stop 31 of FIG. 2.

Figure 4:
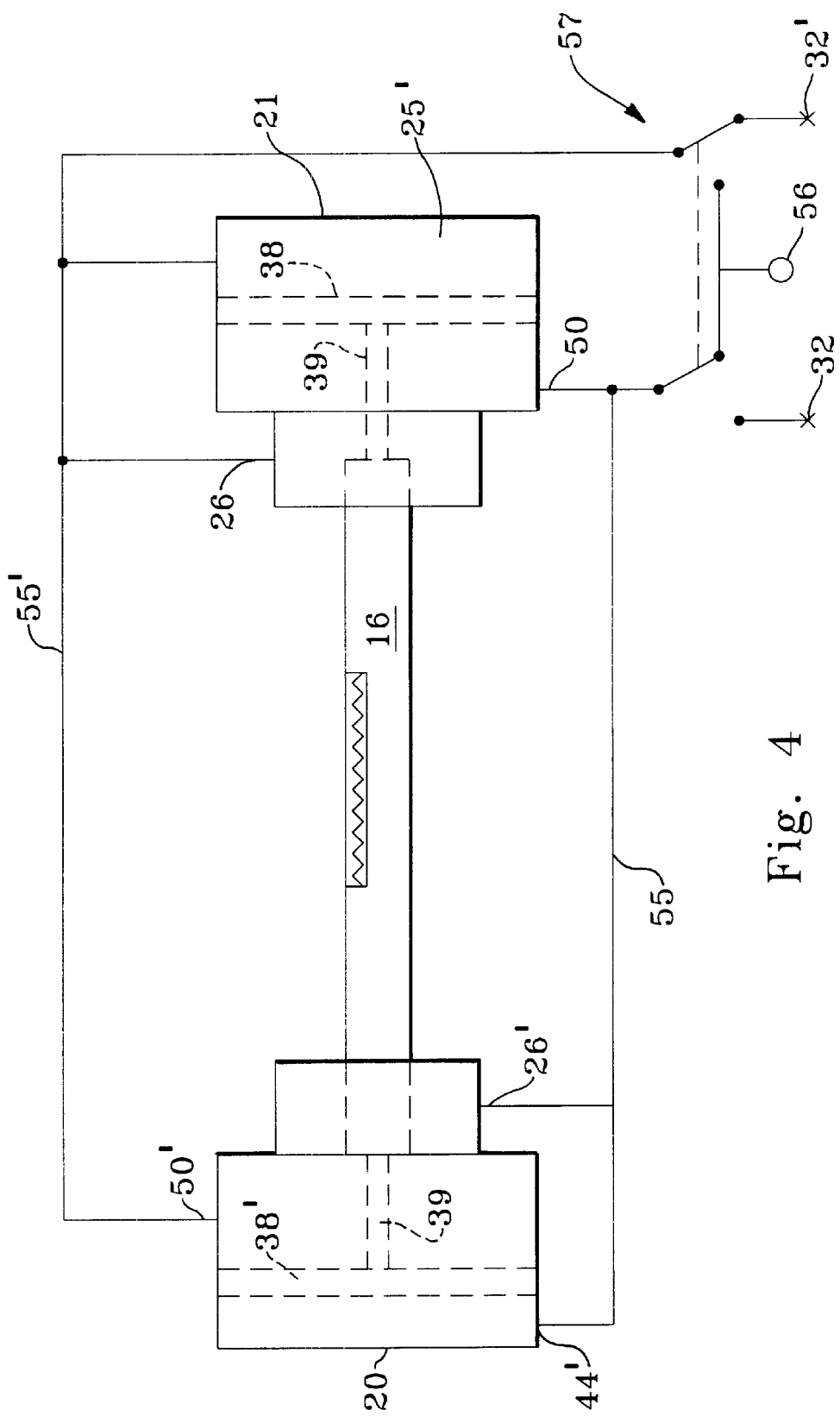
FIG. 4 shows a rough sketch of the compressed-air control system for the workpiece table of FIG. 1, in an embodiment of the shift drive differing again from those of FIGS. 2 and 3.

FIG. 4 shows, in a rough sketch, the compressed-air control system for the workpiece table of FIG. 1, shift drive 20, 21 being shown here in a further embodiment. For reasons of clarity, representation of the workpiece table itself has been omitted in FIG. 4.

FIG. 4 now shows both shift drives 20, 21, which are connected via compressed-air lines 55 and 55' to a compressed-air source 56. A changeover switch 57 which connects either compressed-air line 55 or compressed-air line 55' to compressed-air source 56 is provided between compressed-air source 56 and compressed-air lines 55, 55'. The respective other compressed-air line 55' or 55 is always connected by changeover switch 57 to valve 32' or 32, respectively, for regulated venting.

Compressed-air line 55 is connected to vent 50 of shift drive 21 and to compressed-air connections 26' and 44' of shift drive 20. Similarly, compressed-air line 55' is connected to vent 50' of shift drive 20 and to compressed-air connections 26 and 44 of shift drive 21.

When, for example, compressed-air line 55 is now connected to compressed-air source 56, toothed rack 16 is then shifted to the right in FIG. 4 via auxiliary thrust piston 38' and via its end face 28. At the same time, auxiliary thrust piston 38 of shift drive 21 is also shifted to the right, for which purpose vent 50 is acted upon by compressed air. Shift drive 21 must therefore move only toothed rack 16 and the workpiece table, while auxiliary thrust piston 38 is moved to the right in FIG. 4 by means of, so to speak, a separate energy drive. The mass to be moved by shift drive 20 is thereby reduced as compared with the embodiment of FIG. 3, where the respective auxiliary thrust piston 38 not being used for thrust purposes also needed to be displaced by the respective other shift drive 20, 21.

Because the mass to be moved is lower, the shift velocity for the workpiece table is thereby once again increased.

During this displacement of toothed rack 16 to the right in FIG. 4, compressed-air line 55' acts as an air discharge line, for which purpose changeover switch 57 has connected compressed-air line 55' to valve 32'. Pressure chambers 25 and 25' (visible in FIG. 3) are now vented through valve 32', which is a throttling valve with a constant cross section; this means that compressed-air connections 26 and 44 are now being used for venting. Damping of the movement of toothed rack 16 now takes place here primarily by way of the pressure in pressure chamber 25 in front of end face 28 of toothed rack 16. Only when toothed rack 16 comes into contact with piston rod 39 of auxiliary thrust piston 38 does pressure chamber 25' also have a damping effect, shock absorber 34 also being utilized now.

If toothed rack 16 is to be shifted to the left in FIG. 4, changeover switch 57 then switches over and connects compressed-air line 55' to compressed-air source 56, while compressed-air line 55 is connected to valve 32. Otherwise the procedure is then exactly as described above for the opposite movement direction.

I claim:

1. A workpiece table, provided for a machine tool, comprising a rotational drive having a gear part joined to said workpiece table, a toothed rack in engagement with said gear part, a medium-actuated shift drive acting on said toothed rack for displacing same in the sense of a linear stroke movement between two end locations, and two stops for delimiting said stroke movement at said end locations, upon execution of said stroke movement said workpiece table being moved back and forth between two end positions corresponding to said end locations of said toothed rack, wherein a mechanism is provided which displaces the toothed rack with a higher feed force at the beginning of the linear stroke movement than during the remainder of the linear stroke.

2. The workpiece table of claim 1, wherein the mechanism comprises an auxiliary shift drive which temporarily acts upon the toothed rack with an additional feed force at the beginning of the linear stroke movement.

3. The workpiece table of claim 2, wherein the auxiliary shift drive is medium-actuated.

4. The workpiece table of claim 2, wherein an auxiliary shift drive is provided for each linear stroke direction of the toothed rack.

5. The workpiece table of claim 2, wherein the shift drive comprises thrust pistons at both end faces of the toothed rack acting respectively thereon, and the auxiliary shift drive contains, at the two end faces, auxiliary thrust pistons acting respectively thereon, which have a greater piston surface area than the thrust pistons and perform a shorter linear stroke than the latter.

6. The workpiece table of claim 2, wherein the toothed rack is configured as a bidirectionally medium-actuated thrust piston having two end faces, an actuation medium, and a respective auxiliary thrust piston which has a greater diameter than the toothed rack at its end faces and performs a shorter stroke than the toothed rack, acting on each of said end faces.

7. The workpiece table of claim 6, wherein each auxiliary thrust piston acts with it piston rod on the associated end face of the toothed rack, a stop for each auxiliary thrust piston being provided to delimit the linear stroke performed thereby.

8. The workpiece table of claim 1, wherein two damping mechanisms are provided, each acting between a stop for the toothed rack and the toothed rack itself in order to decelerate the rotating workpiece table in its end positions.

9. The workpiece table of claim 8, wherein the damping mechanism comprises means for building up a regulated counterpressure for controlled deceleration of the moving toothed rack.

10. The workpiece table of claim 4, wherein two damping mechanisms are provided, each acting between a stop for the toothed rack and the toothed rack itself in order to decelerate the rotating workpiece table in its end positions.

11. The workpiece table of claim 10, wherein each respective damping mechanism is configured on the shift drive and/or the auxiliary shift drive.

12. The workpiece table of claim 9, wherein the damping mechanism generates, on the thrust side of the auxiliary thrust piston not presently being used to drive the toothed rack and/or on the associated end face of the toothed rack, a counterpressure which, during the return stroke of said auxiliary thrust piston effected by the toothed rack, decelerates the linear stroke movement of the toothed rack.

13. The workpiece table of claim 9, wherein the counterpressure has a regulated pressure profile.

14. The workpiece table of claim 9, wherein each auxiliary thrust piston has on its thrust side a pressure chamber to be vented by a vent valve, and venting of the pressure chamber is enabled in controlled fashion, during the return stroke effected by the toothed rack, in such a way that a high counterpressure initially builds up for damping purposes, and is vented or limited when the toothed rack approaches its end location.

15. The workpiece table of claim 9, wherein the thrust piston has at each of its end faces a pressure chamber to be vented by a vent valve, and venting of the pressure chamber is enabled in controlled fashion, during the return stroke effected by the toothed rack, in such a way that a high counterpressure initially builds up for damping purposes, and is vented or limited when the toothed rack approaches its end location.

16. The workpiece table of claim 1, wherein each damping mechanism comprises a shock absorber which acts between the piston rod and stop.

17. The workpiece table of claim 1, wherein the shock absorber acts between the toothed rack and auxiliary thrust piston.

18. The workpiece table of claim 16, wherein the shock absorber is arranged in the toothed rack and/or in the piston rod of the auxiliary thrust piston.

19. The workpiece table of claim 14, wherein the regulated valve is a throttling valve that, when an opening pressure or a specific position of the piston is reached, preferably automatically vents the pressure chamber.

20. The workpiece table of claim 14, wherein the regulated valve is a throttling valve that operates with a constant throttling cross section.

21. An auxiliary shift drive for a rotational drive for a workpiece table of a machine tool which can be moved back and forth between two end positions, the rotational drive having a gear part joined to the workpiece table for rotation thereof, a toothed rack in engagement therewith, as well as a medium-actuated shift drive for displacement of the toothed rack, which thereby performs a linear stroke motion, delimited by stops, between two end locations corresponding to the end positions of the workpiece table, the auxiliary shift drive having means acting temporarily on the toothed rack with an additional feed force at the beginning of the linear stroke movement.

22. The auxiliary shift drive of claim 21, wherein it comprises a damping mechanism which builds up at its thrust side, during the return stroke effected by the toothed rack, a regulated counterpressure for controlled deceleration of the moving toothed rack.

23. A damping mechanism for a rotational drive for a workpiece table of a machine tool which can be moved back and forth between two end positions, the rotational drive having a gear part joined to the workpiece table for rotation thereof, a toothed rack in engagement with said gear part, as well as a medium-actuated shift drive for displacement of the toothed rack, which thereby performs a linear stroke motion, delimited by stops, between two end locations corresponding to the end positions of the workpiece table, such that the damping mechanism builds up a regulated counterpressure for controlled deceleration of the moving toothed rack.

* * * * *

UNITED STATES PATENT AND TRADEMARK OFFICE
CERTIFICATE OF CORRECTION

PATENT NO. : 6,385,831 B1
DATED : May 14, 2002
INVENTOR(S) : Peter Grund

It is certified that error appears in the above-identified patent and that said Letters Patent is hereby corrected as shown below:

Column 7,
Line 17, "newauxiliary" should read -- new auxiliary --;
Line 41, "fort h" should read -- forth --;
Line 55, "mirrorimage" should read -- mirror-image --; and Column 9,
Line 32, "25' s" should read -- 25' --.

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,385,831 B1
DATED : May 14, 2002
INVENTOR(S) : Peter Grund

It is certified that error appears in the above-identified patent and that said Letters Patent is hereby corrected as shown below:

Title page,
Insert Item:

-- [73] Assignee: Chiron-Werke GmbH & Co., KG, Germany --;

Signed and Sealed this

Tenth Day of August, 2004

JON W. DUDAS
*Acting Director of the United States Patent and Trademark Office*